April 29, 1930. A. JEZEK 1,756,463
COMBINED AUTOMOBILE AND AEROPLANE
Filed March 7, 1928 4 Sheets-Sheet 1

INVENTOR.
Anton Jezek.
By Bryant & Lowry
ATTORNEYS

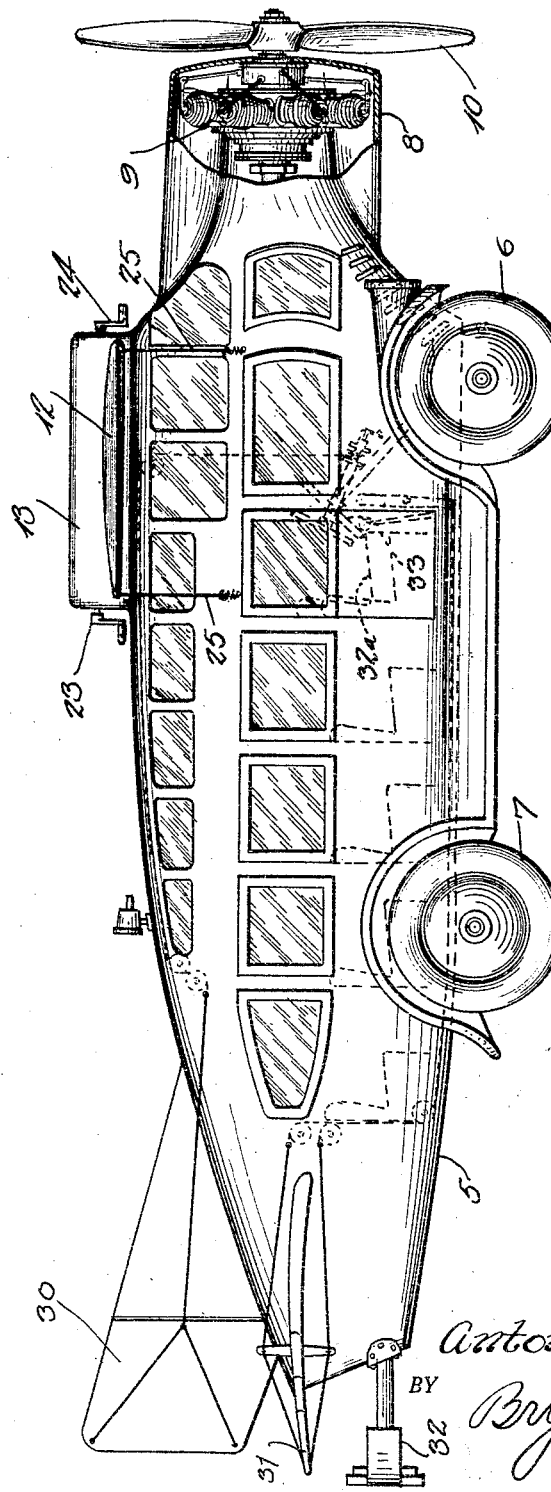

April 29, 1930. A. JEZEK 1,756,463
COMBINED AUTOMOBILE AND AEROPLANE
Filed March 7, 1928 4 Sheets-Sheet 3
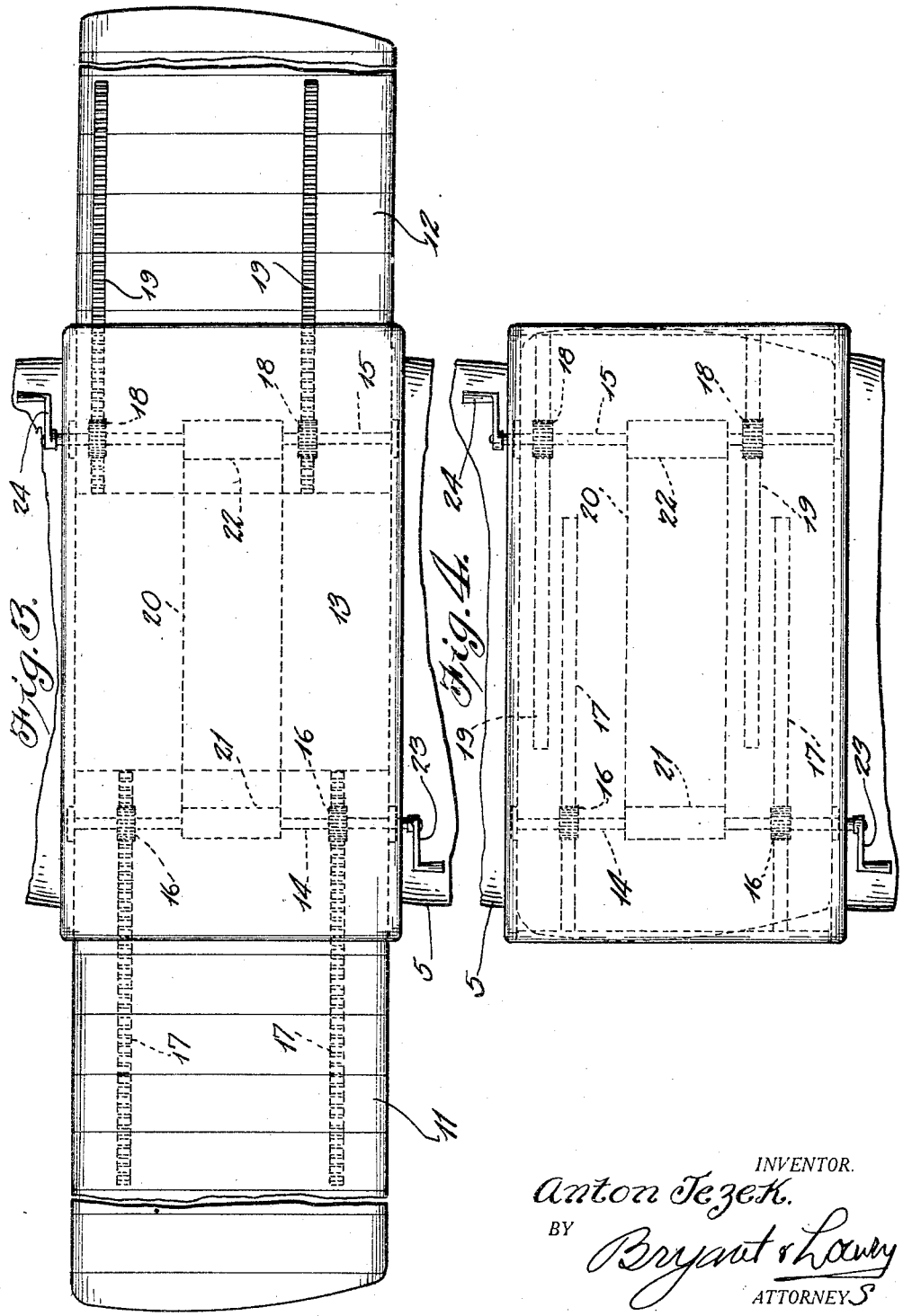

April 29, 1930. A. JEZEK 1,756,463
COMBINED AUTOMOBILE AND AEROPLANE
Filed March 7, 1928 4 Sheets-Sheet 4
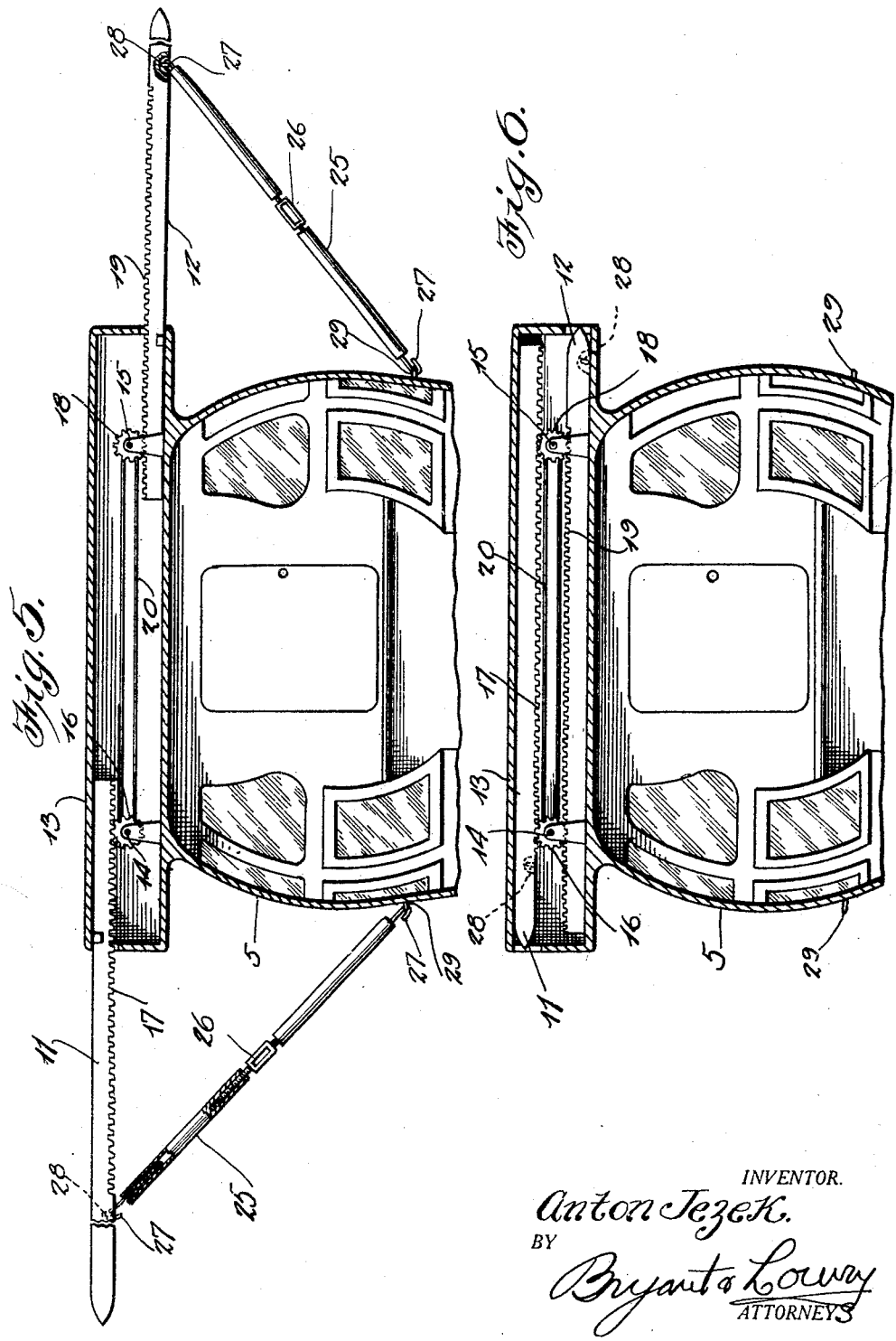
INVENTOR.
Anton Jezek.
BY
Bryant & Lowry
ATTORNEYS Patented Apr. 29, 1930

1,756,463

UNITED STATES PATENT OFFICE

ANTON JEZEK, OF HOPKINS, MINNESOTA, ASSIGNOR OF ONE-HALF TO GUSTAVE A. BETHKE, OF HOPKINS, MINNESOTA

COMBINED AUTOMOBILE AND AEROPLANE

Application filed March 7, 1928. Serial No. 259,769.

This invention relates to an improved combined automobile and aeroplane adapted for use either on land or in the air.

The primary object of the present invention is to provide a novel and improved vehicle of the above type, while other specific objects relate to the provision of retractable wings, projecting and retracting means for said wings, and detachable and adjustable bracing connections for the wings when projected.

The invention consists in the novel form, combination and arrangement of parts hereinafter more fully described, shown in the accompanying drawings and claimed.

In the drawings, wherein like reference characters indicate corresponding parts throughout the several views, Figure 1 is a top plan view of a combined automobile and aeroplane embodying the present invention;

Figure 2 is a side elevational view thereof, partly broken away and in section;

Figure 3 is an enlarged fragmentary top plan view showing the super-structure for housing the wings, and the wings in projected position and partly broken away;

Figure 4 is a view similar to Figure 3 with the wings retracted;

Figure 5 is a fragmentary transverse vertical section of the construction shown in Figure 3; and Figure 6 is a view similar to Figure 5 of the construction as shown in Figure 4.

Figure 1:
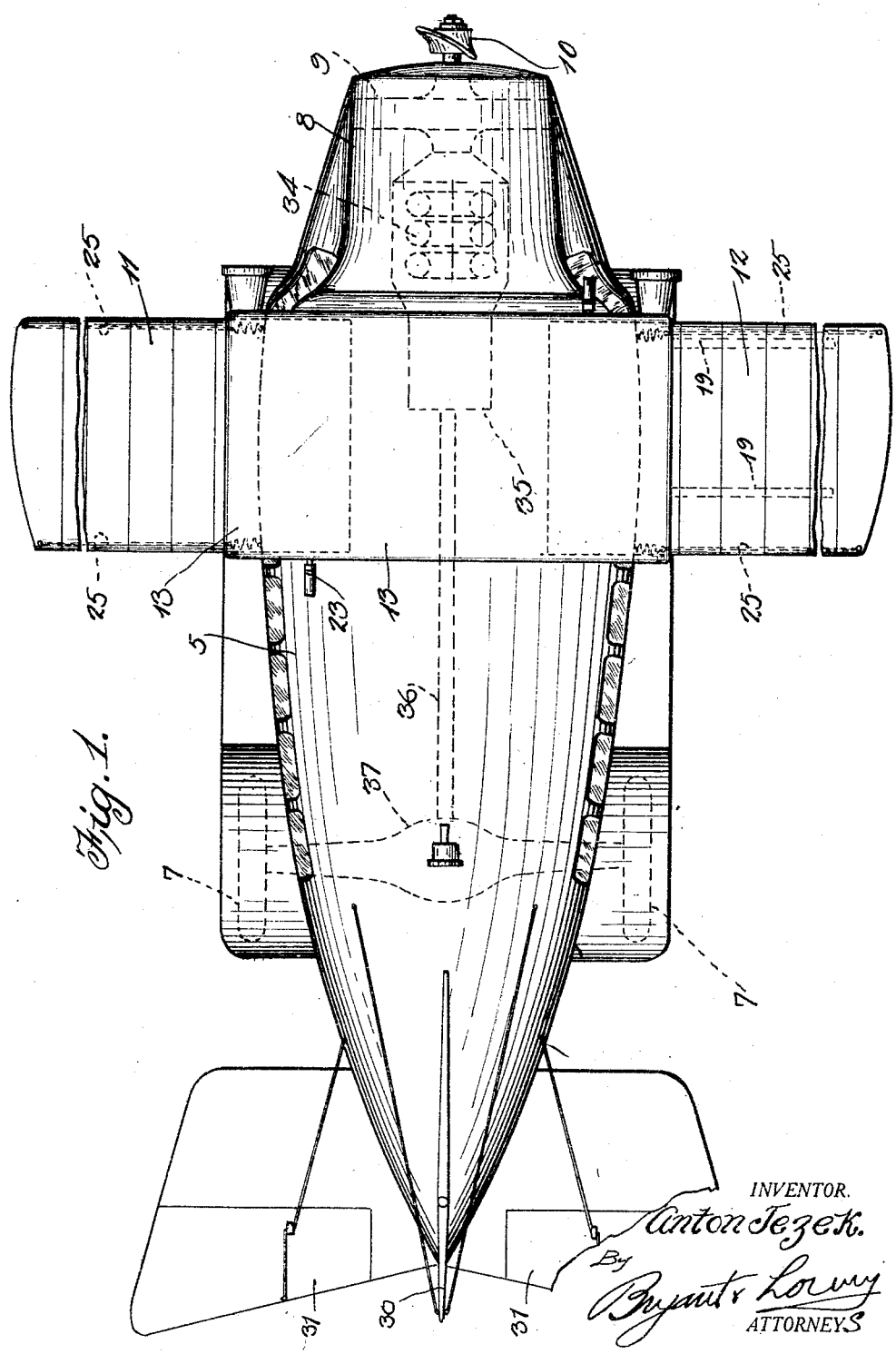

Referring more in detail to the drawings, the present invention includes a body 5 of substantially stream line form and supported by means of a spring suspension of ordinary type on front steering and supporting wheels 6 and rear driving and supporting wheels 7.

The body 5 is provided with a projecting nose portion 8 within which is suitably mounted a conventional internal combustion engine 9 of the radial type whose power shaft projects through the front wall of the nose portion 8 and has a screw tractor propeller 10 mounted thereon.

To support the machine in the air, I provide a pair of wings 11 and 12 which are mounted on the body to be retracted over the latter when the machine travels on land. As shown, the body 5 is provided with a hollow super-structure 13 in which the wings 11 and 12 are mounted for horizontal sliding movement, and into and out of which the wings 11 and 12 are adapted to be retracted and projected, respectively. As shown clearly in Figures 5 and 6 the wings 11 and 12 are arranged in adjacent but different horizontal planes so that they may move inwardly past each other to superposed positions when retracted within the super-structure 13. For the purpose of conveniently projecting and retracting the wings 11 and 12, a pair of horizontal longitudinally arranged shafts 14 and 15 are suitably journaled in the super-structure 13 in a horizontal plane between the wings 11 and 12 and respectively adjacent opposite sides of the super-structure 13. pinions 16 being secured upon the shaft 14 for meshing with a pair of rack bars 16 on the under side of the wing 11, similar pinions 18 being secured upon the shaft 5 to mesh with rack bars 19 provided upon the upper surface of the wing 12, and the shafts 14 and 15 being operatively connected by means of an endless driving belt 20 passing around pulleys 21 and 22 on the shafts 14 and 15 to operatively connect the latter so that turning of either shaft will effect rotation of the other and simultaneous movement of both wings. It will be noted that the racks and pinions of one wing are in different vertical planes from those of the other wing so that each set of racks and pinions is only operatively associated with one wing. In order that both projection and retraction of the wings may be effected by rotation of a shaft in a clockwise direction, the shaft 14 has a rear projecting end provided with an operating handle or crank 23, while the shaft 15 has a forward projecting end provided with a similar operating handle or crank 24.

In order to effectively brace the wings 11 and 12 against damaging upward strain when the vehicle is in flight and the wings are projected, while permitting free retraction of the wings when travelling on land, I provide pairs of detachable adjustable braces 25, one pair being provided for connecting the outer end portion of each wing with the lower portion of the body 5 at the adjacent side of the vehicle. As shown, each brace consists of a pair of hollow sections adjustably connected by means of a turn buckle 26 or the like and having spring retracted hooks 27 at their outer ends adapted for respective detachable engagement in eyes 28 provided on the underside of the outer end portion of the wings and eyes 29 provided on the sides of the body 5 below the wings. Obviously, by providing the spring retracted hooks 27, the bracing connections are rendered slightly resilient to allow tolerable yielding of the wings, the desired tension being effected by adjustment of the turn buckle 26 in an obvious manner. The adjustment obtained by the use of the turn buckles 26 also facilitates connection and disconnection of the braces from the wings and body. Vertical and horizontal rudders or steering vanes 30 and 31 are provided at the rear of the body and protected against damage when travelling upon land by the provision of a rear bumper or fender 32 mounted on the body below the horizontal rudders or vanes 31. The operation of the engine 9 and the steering vanes or rudders are conveniently controlled in any well known manner from the driver's seat indicated by dotted lines at 32 in Figure 2, and an ordinary steering wheel is provided at 33 to deflect the front wheels 6 and govern the direction of travel of the vehicle when travelling upon land.

A further internal combustion engine may be mounted in the front end of the body 5 to the rear of the engine 9 as at 34 and operatively connected to the rear supporting and driving wheels 7 by a mechanism of ordinary type for driving the rear wheels 7 when the machine is travelling on land, said mechanism including a transmission gearing at 35, a longitudinal propeller shaft as at 36, and a rear axle assembly including a differential gear as at 37.

Having thus described my invention, what I claim as new and desire to secure by Letters Patent is:—

1. The combination with a vehicle of the class described comprising a body mounted on traction wheels and provided with an air propeller and driving means, of a hollow superstructure of substantially the same width of the body and having end openings, a pair of wings slidably mounted in said superstructure and adapted to be projected out of and retracted into said superstructure in opposite directions, said wings being provided with racks, and said superstructure having mounted therein pinions engaging with said racks, for the purpose of moving said wings, the shafts of said pinions being coupled together for conjoint movement and provided with means for simultaneously moving both wings by the manual operation of either shaft.

2. A combined aeroplane and land vehicle comprising a body, a superstructure, extensible and retractible wings mounted in said superstructure and detchable braces connecting said wings to the body and provided with resilient end connections.

In testimony whereof I affix my signature.

ANTON JEŽEK.